United States Patent [19]

Bell, Jr. et al.

[11] Patent Number: 4,460,815
[45] Date of Patent: Jul. 17, 1984

[54] CURRENT LIMIT SYSTEM AND METHOD FOR ELECTRICAL DISCHARGE MACHINING APPARATUS

[75] Inventors: Oliver A. Bell, Jr., Wilmington; Randall C. Gilleland, Troutman, both of N.C.

[73] Assignee: Colt Industries Operating Corp., New York, N.Y.

[21] Appl. No.: 379,070

[22] Filed: May 17, 1982

[51] Int. Cl.³ .............................................. B23P 1/08
[52] U.S. Cl. .................................. 219/69 M; 219/69 P; 219/69 S
[58] Field of Search ................. 219/69 S, 69 P, 69 M, 219/69 C, 69 R

[56] References Cited

U.S. PATENT DOCUMENTS 4,306,135  12/1981  Bell, Jr. et al. ...................... 219/69 P
4,319,114  3/1982  Bell, Jr. et al. ...................... 219/69 P
4,357,516  11/1982  Inoue .................................. 219/69 P Primary Examiner—M. H. Paschall
Attorney, Agent, or Firm—Harry R. Dumont

[57] ABSTRACT

A programmable system for controlling maximum machining current. A current limit is entered into the system together with the on-time and off-time desired. The system operates to use the desired on-time and current values, but the off-time will be modified depending on the maximum current limit possible. This will protect the apparatus when an impossible combination has been entered by the operator. Minimum allowable period is calculated for any desired current limit. The desired period is subtracted from the minimum period and the difference added to the off-time if the result is positive.

12 Claims, 2 Drawing Figures

CURRENT LIMIT SYSTEM AND METHOD FOR ELECTRICAL DISCHARGE MACHINING APPARATUS

TECHNICAL FIELD

This invention relates to a current limiting and protective system for electrical discharge machining.

BACKGROUND ART

It is important to the process of electrical discharge machining, sometimes hereinafter referred to as "EDM" that the machining power pulses provided at the gap are of closely and precisely controllable on-off time and frequency to insure repeatability of results and to provide appropriate cutting action for the type of operation being carried on. Various types of pulse generators which have this capability have been developed and are in commercial use for EDM. One commonly used type of EDM power supply includes as a principal part of its machining power pulse generator an astable multivibrator in which on-off time and frequency are controlled and preset by a ganged capacitor and resistor arrangement. One example of this type of pulse generator and an associated protection system is shown and described in Kurt H. Sennowitz, U.S. Pat. No. 3,649,802, issued on Mar. 14, 1972 for "Protective System for Electrical Discharge Machining Power Supply Circuit", which patent is of common ownership herewith.

A further arrangement for digital type EDM pulse generator is shown and described in Oliver A. Bell, Jr., U.S. Pat. No. 3,809,847, issued on May 7, 1974, for "Method and Apparatus for Electrical Discharge Machining".

A still further type of digital multivibrator is shown and described in Oliver A. Bell, Jr., U.S. Pat. No. 4,071,729, issued on Jan. 31, 1978, for "Adaptive Control System and Method for Electrical Discharge Machining". This patent shows an on and off time generator which receives inputs from a programmable computer and from this general arrangement provides machining power pulses to the machining gap. All the above noted patents are of common ownership herewith.

The present invention is particularly designed for use with a digital pulse generator that is controlled by a programmable computer or similar input device. Reference is made to our copending U.S. patent application Ser. No. 068,328 filed on Aug. 21, 1979 for "Programmable Pulse Generator for Electrical Discharge Machining Apparatus", to issue Mar. 16, 1982 as U.S. Pat. No. 4,320,279, Oliver A. Bell, Jr. et al.

The prior art has shown a number of current limiting systems for EDM in which a current limit is relay set in accordance with the frequency at which the pulse generator is operating. The present invention goes further and allows on and off times and current limit to be entered. The off-time is then readjusted to an allowable maximum value for the current limit desired.

DISCLOSURE OF THE INVENTION

The invention provides a current limit system and method for EDM which operated to receive the on-time and off-time desired and preset by the operator. The method insures that the frequency to current limit ratio is within workable limits. The method includes a comparing the operator preset values to a predetermined value. If the operator preset period (off-time plus on-time) is greater than that value, the machining operation proceeds. If the period is less than that value, a minimum allowable period is calculated by taking the current limit number and dividing by 4 and 8. The results are added to determine the base minimum period. The desired or preset period is then subtracted from the minimum period and the difference added to the off-time. Electrical discharge machining then proceeds.

The present invention, its operation, features and advantages, and the advancements which it afford will be understood from the following specification together with the drawings in which like numerals are used to refer to similar or like parts where they occur, and wherein:

BEST MODE OF CARRYING OUT THE INVENTION

Figure 1:
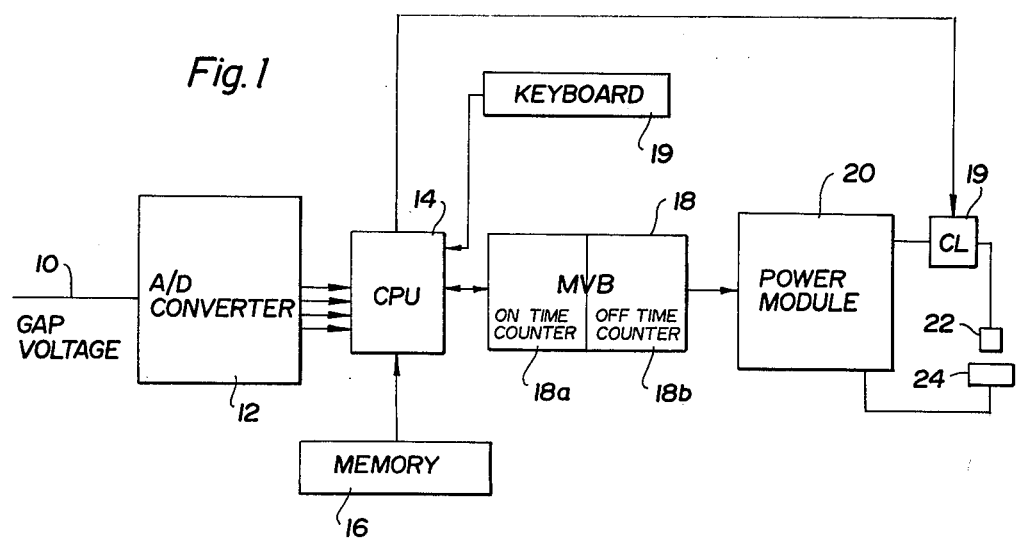
FIG. 1 is a block diagrammatic showing of the system with which our invention is used.

Referring to FIG. 1, there are shown the basic parts of a programmable computer and an associated electrical discharge machining apparatus. Gap voltage is sensed by a voltage sensing network 10. The gap voltage is passed through an analog to digital converter 12 and then to the CPU 14 of the programmable computer. The memory 16 of the microprocessor is also shown. One example of a microprocessor suitable for use in connection with this invention is the microprocessor currently manufactured and sold by the Mostek Corporation, 1215 West Crosby Road, Carrollton, Tex. 75006 and known as the Model MK 3880. It will be understood that parts of the microprocessor can be reconstructed using architecture of the type of the Texas Instruments model 74181 or the 74S181 or the 74LS181 series of four bit slice arithmetic logic units. These units are known in the electronic art and are used to simplify operations such as add, subtract, find equality, negate and still others.

Also shown in FIG. 1 is a digital pulse generator 18 of the counter type as shown and described in our copending application Ser. No. 068,328 referred to above. Keyboard 19 is used for operator input. One counter 18a is present to represent machining pulse on-time. A current limit unit 19 is connected in circuit with the gap and associated with the power module 20. It includes a plurality of relays, six in number, which corresponding to their actuation switch a set of resistors in series with the gap lead to actually limit machining current. The six relays in binary fashion give a total of 64 current limit positions. This will be explained more completely hereinafter. The EDM power output module is indicated by the numeral 20 and further includes the main DC source and an output power switch that is turned on and off by the pulse generator 18 to provide machining power pulses to the machining gap. The machining gap is defined between a tool electrode 22 and a workpiece 24. The gap voltage signal is shown at the left hand side of the drawing. It is used in the pulse generator 18 to control the off-time in a manner that will be further explained in the section "Description of Operation", hereinafter. It will further be clarified by inclusion of an exemplary program for the microprocessor.

Figure 2:
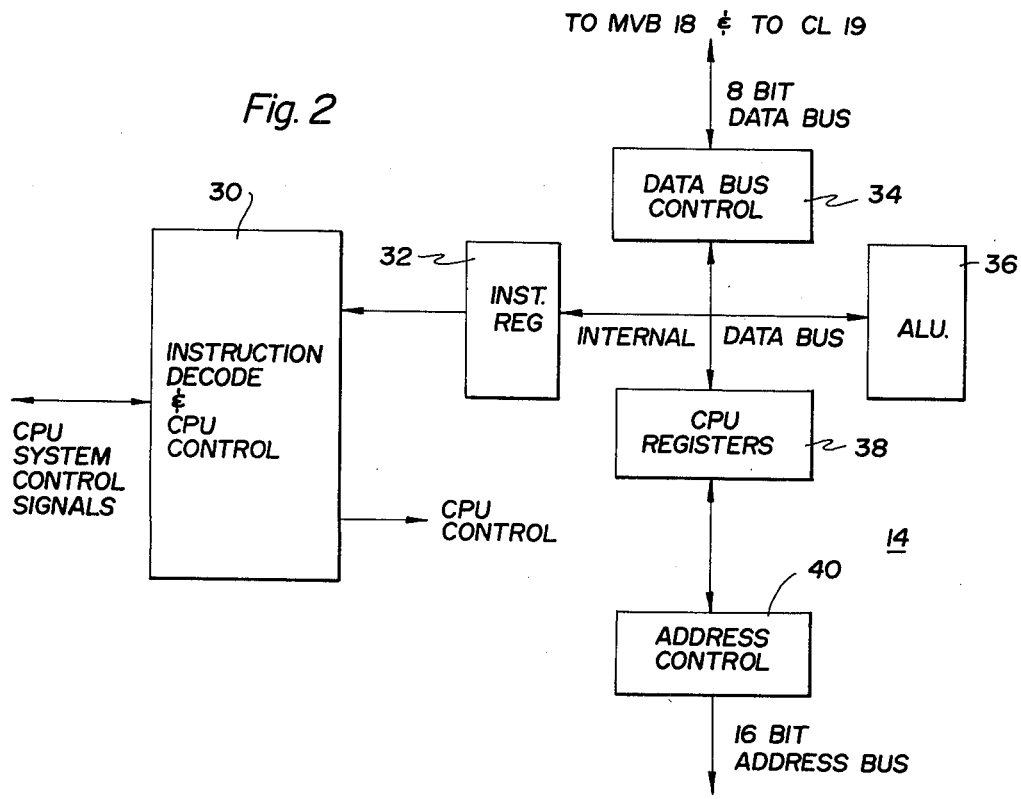
FIG. 2 is a block diagrammatic drawing illustrating one type of programmable computer or microprocessor used with the present invention.

FIG. 2 is a block diagram of the major elements in the CPU 14 and the pulse generator 18. These include the CPU Control 30, internal register 32, data bus control 34, arithmetic logic unit 36, CPU registers 38, and address control 40. The several interfaces and data buses are also shown in the drawing. While the described embodiment of the invention includes elements of a microprocessor, the invention is not limited to this type of device. A variety of different programmable computers can be used.

The following is a program used to provide current limiting in accordance with the teachings of the present invention.

| 0000' | | offix: | | |
|---|---|---|---|---|
| 0000' | 2A 0000* | ld | hl,(oftim) | ; get the present offtime |
| 0003' | EB | ex | de,hl | |
| 0004' | 2A 0000* | ld | hl,(ontim) | ; get the present on time |
| 0007' | 7A | ld | a,d | ; check the upper half |
| 0008' | B7 | or | a | ; is it 0 |
| 0009' | 20 05 | jr | nz,gof | ; >0 so >255 and ok |
| 000B' | 7B | ld | a,e | ; chk for 0 |
| 000C' | B7 | or | a | |
| 000D' | 20 01 | jr | nz,gof | ; >0 so ok |
| 000F' | 13 | inc | de | ; make 1 if it was 0 |
| 0010' | | gof: | | |
| 0010' | 44 | ld | b,h | |
| 0011' | 4D | ld | c,l | ; bc = offtime |
| 0012' | CD 0000* | call | cal | ; correct for 87% duty cycle |
| 0015' | 24 | inc | h | |
| 0016' | 25 | dec | h | |
| 0017' | C0 | ret | nz | ; if H >0 then period was >255 |
| 0018' | 7D | ld | a,l | ; check lower |
| 0019' | D6 14 | sub | 20 | ; if >20 then no action taken |
| 001B' | D0 | ret | nc | ; no overflow is >20 |
| 001C' | 3A 0000* | ld | a,(ctwr) | ; get the current limit |
| 001F' | E6 3F | and | 3fh | ; mask off pol. and cyst bit |
| 0021' | CB 2F | sra | a | ; cl / 2 |
| 0023' | CB 2F | sra | a | ; cl / 4 |
| 0025' | 57 | ld | d,a | ; save cl / 4 |
| 0026' | CB 2F | sra | a | ; cl / 8 |
| 0028' | 82 | add | a,d | ; (cl / 4) + (cl / 8) |
| 0029' | 57 | ld | d,a | ; save it |
| 002A' | 7D | ld | a,l | ; get desired period |
| 002B' | 92 | sub | d | ; desired period - max period |
| 002C' | D0 | ret | nc | ; if desired is > max then ok |
| 002D' | 7A | ld | a,d | ; get max |
| 002E' | 95 | sub | l | ; max period - desired period |
| 002F' | 81 | add | a,c | ; add offtime to difference |
| 0030' | 32 0000* | ld | (oftim),a | ; store in lower |
| 0033' | C9 | ret | | |
| | | end | | |

The following is a representative current limiting table of values used along with the present invention.

| | Minimum Period Allowable |
|---|---|
| Current Limit 0 | 2 Microseconds |
| Current Limit 1 | 2 Microseconds |
| Current Limit 2 | 2 Microseconds |
| Current Limit 3 | 2 Microseconds |
| Current Limit 4 | 2 Microseconds |
| Current Limit 5 | 2 Microseconds |
| Current Limit 6 | 2 Microseconds |
| Current Limit 7 | 2 Microseconds |
| Current Limit 8 | 3 Microseconds |
| Current Limit 9 | 3 Microseconds |
| Current Limit 10 | 3 Microseconds |
| Current Limit 11 | 3 Microseconds |
| Current Limit 12 | 4 Microseconds |
| Current Limit 13 | 4 Microseconds |
| Current Limit 14 | 4 Microseconds |
| Current Limit 15 | 4 Microseconds |
| Current Limit 16 | 6 Microseconds |
| Current Limit 17 | 6 Microseconds |
| Current Limit 18 | 6 Microseconds |
| Current Limit 19 | 6 Microseconds |
| Current Limit 20 | 7 Microseconds |
| Current Limit 21 | 7 Microseconds |
| Current Limit 22 | 7 Microseconds |
| Current Limit 23 | 7 Microseconds |
| Current Limit 24 | 9 Microseconds |
| Current Limit 25 | 9 Microseconds |
| Current Limit 26 | 9 Microseconds |
| Current Limit 27 | 9 Microseconds |
| Current Limit 28 | 10 Microseconds |
| Current Limit 29 | 10 Microseconds |
| Current Limit 30 | 10 Microseconds |
| Current Limit 31 | 10 Microseconds |
| Current Limit 32 | 12 Microseconds |
| Current Limit 33 | 12 Microseconds |
| Current Limit 34 | 12 Microseconds |
| Current Limit 35 | 12 Microseconds |
| Current Limit 36 | 13 Microseconds |
| Current Limit 37 | 13 Microseconds |
| Current Limit 38 | 13 Microseconds |
| Current Limit 39 | 13 Microseconds |
| Current Limit 40 | 15 Microseconds |
| Current Limit 41 | 15 Microseconds |
| Current Limit 42 | 15 Microseconds |
| Current Limit 43 | 15 Microseconds |
| Current Limit 44 | 16 Microseconds |
| Current Limit 45 | 16 Microseconds |
| Current Limit 46 | 16 Microseconds |
| Current Limit 47 | 16 Microseconds |
| Current Limit 48 | 18 Microseconds |
| Current Limit 49 | 18 Microseconds |
| Current Limit 50 | 18 Microseconds |
| Current Limit 51 | 18 Microseconds |
| Current Limit 52 | 19 Microseconds |
| Current Limit 53 | 19 Microseconds |
| Current Limit 54 | 19 Microseconds |
| Current Limit 55 | 19 Microseconds |
| Current Limit 56 | 21 Microseconds |
| Current Limit 57 | 21 Microseconds |
| Current Limit 58 | 21 Microseconds |
| Current Limit 59 | 21 Microseconds |
| Current Limit 60 | 22 Microseconds |
| Current Limit 61 | 22 Microseconds |
| Current Limit 62 | 22 Microseconds |
| Current Limit 63 | 22 Microseconds |

The basic purpose of the present invention is to verify that the frequency to limit ratio is within operable limits. The approach is to determine a minimum on/off time period or a maximum frequency for a given current limit that has been preset by the operator on the power supply. This is performed not by a look-up type table operation but rather by a simple and straightforward mathematical means. If the period comprising the on-time plus the off-time is greater than 20 microseconds, the operation can be permitted to proceed without need for current limiting operation. When this situation exists as shown by the program, the sub-routine will exit, go back into the normal preset machining program. If the period, that is the on-time-off-time period is less than 20 microseconds the current limit must be examined since a current limit of 63 for example requires an on/off period of 20 microseconds or greater. The minimum allowable period is calculated. For every value of current limit there is a minimum on/off period that we must provide to insure proper EDM cutting. For example, in the current limit table for the current limit number 39, the minimum allowable period would be 13 microseconds. If we had a current limit setting of 50, the minimum allowable period would be 18 microseconds.

Now referring to the program, at location zero as shown by the first line of the program, the minimum allowable period is entered at a sub-routine called offix. The upper half of the register containing the on-time is checked for zero. If it is seen, that the on-time is zero, this is an impossible condition. Since we cannot have a zero on-time, we add one and end up with a number that is greater than zero. At that time we go into the sub-routine called cal. This corrects the off-time to give a maximum duty cycle of 87 percent. In the sub-routine called cal at the location of 0012, the desired on/off time period is calculated and will be returned in registers H and L. The next step is to check the number for 255 or greater than 20. If it is greater than 20 there is no reason to continue in this particular program. We exit through a return located at 001B. If the total period is less than 20 microseconds, it becomes necessary to look at the current limit setting to see if the current limit setting allows us to have such a short total period. We then load in the current limit setting at location 001C. This is done through the instruction load A with the current limit. Unused information represented by several bits of the register such as polarity and cycle start bits are stripped off. We end up with six bits in the accumulator that are representative of the current limit. These are then shifted right twice through an SRA instruction to divide by 2 and then divide by 4. That divide by 4 number is saved in the D register and we shift the accumulator to the right again which divides if by 8. We add the two numbers together and save them again in the register D. Then we go back, take the desired on/off time period that was returned to us from the sub-routine cal and we check and see if it is greater or less than the decided minimum allowable period. If it is greater, we exit the program. If it's less than the minimum allowable period then we have to subtract the two and calculate a new off-time to bring a total period up to the minimum allowable on/off time period. We do that in line 002F. We add the off-time to the difference and store it in oftim so that it becomes our new off-time number. The the subroutine ends and there is a return to normal preprogrammed operation.

It will now be seen that the method of the present invention includes dividing by simple binary number 2, 4 and 8 and then adding these together to get a number which is a factor ⅜'s which is relatively close and much simpler to arrive at than the desired 0.333. This represents a mathematical approach of taking the current limit dividing it by 3 or an approximation of that value and using that as a basis for on/off time total period.

It will thus be seen that we have provided a novel method and system for current limiting for electrical discharge machining.

We claim:

1. The method of current limiting for electrical discharge machining apparatus including means for controlling gap current and a pulse generator including an on-time and an off-time control means, comprising the steps of:
    (a) preselecting a plurality of values each representative of pulse on and off-time total period and of a current limit magnitude setting;
    (b) making an initial check to determine if the total period is greater than a predetermined minimum amount thus to permit any of the current limit settings and accordingly inhibiting further current limit checking and allowing machining operation to proceed; and
    (c) if the total period is less than said predetermined amount, mathematically determining the minimum allowable pulse on/off time period by dividing the current limit magnitude setting by approximately 3 and altering the off-time accordingly.

2. The improvement of claim 1, wherein the means for said mathematical determining the minimum allowable pulse on/off time are entered in a computer for storing.

3. The improvement of claim 1, wherein said step (c) comprises calculating the minimum allowable pulse on/off time period by taking the current limit magnitude setting, dividing it successively by 4 and 8 and adding the results.

4. The improvement of claim 3, wherein the preselected period is subtracted from the minimum allowable period and the difference is added to the preselected off-time.

5. The improvement of claim 1, wherein the values are provided by keyboard inputs.

6. The improvement of claim 1, wherein the values are entered by thumbwheel switches.

7. The improvement of claim 1, wherein the values are entered by binary switches.

8. In a current limit system for electrical discharge machining apparatus including means for controlling magnitude of gap current flow, a pulse generator for the apparatus having an on-time and an off-time counter, and means for preselecting values representative of a pulse on and off-time period and of current limit setting, the method including the steps of;
    (a) initially checking a minimum allowable total time period against the period of the selected on/off time;
    (b) enabling the further operation of the system if the selected period is less than such minimum allowable total;
    (c) calculating a minimum allowable period by dividing the current limit by 4 and by 8 and adding the results to determine the base minimum period;
    (d) subtracting the preselected period from the base minimum period and adding the difference to the preselected off-time to give a modified off-time; and
    (e) entering the modified off-time in said pulse generator.

9. The improvement of claim 8, wherein said means for controlling magnitude of gap current comprises a relay operated variable current metwork in the EDM gap circuit.

10. The improvement of claim 8, wherein said means for preselecting comprises an operator keyboard.

11. The improvement of claim 8, wherein said values are entered in a register of a programmable computer.

12. The improvement of claim 8, wherein said means for controlling gap current magnitude comprises a relay operated variable current network in series with the machining gap.

* * * * *